United States Patent
He et al.

(10) Patent No.: US 11,255,798 B1
(45) Date of Patent: Feb. 22, 2022

(54) METHOD OF DETECTING LENS CLEANLINESS USING OUT-OF-FOCUS DIFFERENTIAL FLAT FIELD CORRECTION

(71) Applicant: MLOptic Corp, Redmond, WA (US)

(72) Inventors: Jiang He, Hangzhou (CN); Teresa Zhang, Albany, NY (US); Wei Zhou, Sammamish, WA (US); Bin Zhang, Nanjing (CN)

(73) Assignee: MLOptic Corp., Redmond, WA (US)

( * ) Notice: Subject to any disclaimer, the term of this patent is extended or adjusted under 35 U.S.C. 154(b) by 0 days.

(21) Appl. No.: 17/485,253

(22) Filed: Sep. 24, 2021

(51) Int. Cl.
   *G01N 21/958* (2006.01)
   *G01N 21/88* (2006.01)

(52) U.S. Cl.
   CPC ... *G01N 21/958* (2013.01); *G01N 2021/8825* (2013.01); *G01N 2021/9583* (2013.01)

(58) Field of Classification Search
   CPC ......... G01N 21/958; G01N 2021/8825; G01N 2021/9583
   See application file for complete search history.

(56) References Cited

U.S. PATENT DOCUMENTS 6,388,809 B1 * 5/2002 MacAulay ........... G02B 21/006
   359/379

* cited by examiner

*Primary Examiner* — Tri T Ton
(74) *Attorney, Agent, or Firm* — Tracy Jong Law Firm; Tracy P. Jong; Cheng Ning Jong

(57) ABSTRACT

A method for detecting lens cleanliness of a lens in a flat-field optical path, the flat-field optical path includes a light source, the lens, a camera, the light source is a narrow-band multispectral uniform surface light source, the camera's light-sensitive surface is disposed perpendicular to an optical axis of the lens and in the light position of the lens, the method including disposing the camera such that the camera's light-sensitive surface is located a distance from the focal plane of the lens and measuring the bright-field image data and the dark-field image data; for each pixel, performing an out-of-focus differential flat field correction to yield a plurality of DiDj out-of-focus differentials; repeating the disposing and performing steps by altering the distance at least two more times; and displaying the out-of-focus differentials in the form of a plurality of images to show uniformity of each of the plurality of images.

3 Claims, 3 Drawing Sheets

|  | Out-of-Focus D1 | Out-of-Focus D2 | Out-of-Focus D3 | Out-of-Focus D4 | ... | Out-of-Focus DN |
|---|---|---|---|---|---|---|
| Out-of-Focus D1 | Empty | D1D2 Differential | D1D3 Differential | D1D4 Differential | ... | D1DN Differential |
| Out-of-Focus D2 | D2D1 Differential | Empty | D2D3 Differential | D2D4 Differential | ... | D2DN Differential |
| Out-of-Focus D3 | D3D1 Differential | D3D2 Differential | Empty | D3D4 Differential | ... | D3DN Differential |
| Out-of-Focus D4 | D4D1 Differential | D4D2 Differential | D4D3 Differential | Empty | ... | D4DN Differential |
| ... | ... | ... | ... | ... | Empty | ... |
| Out-of-Focus DN | DND1 Differential | DND2 Differential | DND3 Differential | DND4 Differential | ... | Empty |

FIG. 3

METHOD OF DETECTING LENS CLEANLINESS USING OUT-OF-FOCUS DIFFERENTIAL FLAT FIELD CORRECTION

PRIORITY CLAIM AND RELATED APPLICATIONS

This non-provisional application claims the benefit of priority from Chinese Pat. App. No. 2020110298493 filed on Sep. 27, 2020. Said application is incorporated by reference in its entirety.

BACKGROUND OF THE INVENTION

1. The Field of the Invention

The present invention relates to a lens inspection method. More specifically, the present invention is directed to a method for detecting lens cleanliness using out-of-focus differential flat field correction.

2. Background Art

Cleanliness is an important indicator of an imaging system and cleanliness is directly related to stray light, ghosting, uniformity and other key imaging factors. In a lens manufacturing process, the generation of surface defects is often unavoidable. In general, surface defects are local physical or chemical properties of product surface uneven areas, such as inclusions, damage, stains, etc., all having adverse impacts on the cleanliness of the product. Therefore, a lens manufacturer attaches great importance to lens cleanliness inspection, through timely discovery of surface defects of the lens, effective control of product quality, further analysis and solution of problems in the production process, thereby eliminating or reducing the generation of defective products.

Finished lens are predominantly visually inspected. Such method of inspection yields a low sampling rate and accuracy, is real-time poor, inefficient and labor-intensive. These shortcomings are further exacerbated by inspectors' work experience and skills while machine vision-based inspection methods can largely overcome the shortcomings.

Machine vision can be utilized in non-contact and non-destructive automatic inspections, therefore making it an effective means to achieve equipment automation, intelligence and precision control, with advantages in safety, reliability, wide spectral response ranges, reduction of long working hours in harsh environments and high productivity. Machine vision includes an image analysis module, a data management module and a human-machine interface module. An image acquisition module can include a charge-coupled device (CCD) camera, an optical lens, a light source and its clamping device, etc. Its function is to complete the acquisition of images of a product surface. Under the illumination of a light source, a surface of a product is imaged on the camera sensor through an optical lens and the light signal obtained of the surface of the product is converted into an electrical signal, which is then converted into a digital signal that can be processed by a computer. Currently, industrial cameras are mainly based on CCD or complementary metal oxide semiconductor (CMOS) chip technology. CCD is currently the most commonly used image sensor for machine vision. A light source directly affects image quality and its role is to overcome ambient light interference, to ensure image stability and result in images with the highest possible contrast. Currently used light sources are halogen lamps, fluorescent lamps and light-emitting diode (LED). An LED light source is beneficial as it comes in a small form factor, is low in power consumption, is fast in response time, is a good light-emitting monochrome, is highly reliable, is a uniform and stable light, is easy to integrate and is applicable to a wide range of applications.

Illumination systems composed of light sources can be divided into bright-field and dark-field illumination, structured light illumination and stroboscopic illumination according to their illumination methods. Since the bright-field signal itself carries information about the relative illuminance of the large-angle field of view, it can have a non-negligible effect on imaging. However, the manner in which the influence of a low relative illuminance of a large-angle field of view is suppressed, the manner in which the observable range of the impurity to be detected is amplified and the manner in which the detection efficiency of impurity is effectively improved, are the emphases of current researches in the field of lens inspection.

SUMMARY OF THE INVENTION

In accordance with the present invention, there is provided a method for detecting lens cleanliness of a lens in a flat-field optical path, the flat-field optical path including a light source, the lens, a camera, the light source is a narrow-band multispectral uniform surface light source, the camera's light-sensitive surface is disposed perpendicular to an optical axis of the lens and in the light position of the lens, the method including:

(a) disposing the camera such that the camera's light-sensitive surface is located a distance from the focal plane of the lens and measuring the bright-field image data and the dark-field image data;

(b) for each pixel, performing an out-of-focus differential flat field correction to yield a plurality of DiDj out-of-focus differentials, wherein a DiDj out-of-focus differential=(out-of-focus Di bright-field image data−out-of-focus Di dark-field image data)/(out-of-focus Dj bright-field image data−out-of-focus Dj dark-field image data) and Di and Dj are two different defocuses, i is an index ranging from 1 to N, j is an index ranging from 1 to N and N is the number of defocuses;

(c) repeating the disposing step and the performing step by altering the distance at least two more times; and (d) displaying the out-of-focus differentials in the form of a plurality of images to show uniformity of each of the plurality of images, wherein a non-uniform area on each of the plurality of images is determined to have been caused by an impurity of the lens.

In one embodiment, the N is 3; out-of-focus D1 is 0; out-of-focus D2 is 0.05 mm; out-of-focus D3 is −0.05 mm; D1D2 out-of-focus differential=(out-of-focus D1 bright-field image data−out-of-focus D1 dark-field image data)/(out-of-focus D2 bright-field image data−out-of-focus D2 dark-field image data); D1D3 out-of-focus differential=(out-of-focus D1 bright-field image data−out-of-focus D1 dark-field image data)/(out-of-focus D3 bright-field image data−out-of-focus D3 dark-field image data); D2D1 out-of-focus differential=(out-of-focus D2 bright-field image data−out-of-focus D2 dark-field image data)/(out-of-focus D1 bright-field image data−out-of-focus D1 dark-field image data); D2D3 out-of-focus differential=(out-of-focus D2 bright-field image data−out-of-focus D2 dark-field image data)/(out-of-focus D3 bright-field image data−out-of-focus D3 dark-field image data); D3D1 out-of-focus differential=(outof-focus D3 bright-field image data−out-of-focus D3 dark-field image data)/(out-of-focus D1 bright-field image data−out-of-focus D1 dark-field image data); D3D2 out-of-focus differential=(out-of-focus D3 bright-field image data−out-of-focus D3 dark-field image data)/(out-of-focus D2 bright-field image data−out-of-focus D2 dark-field image data).

In one embodiment, the plurality of images include six images including the D1D2 out-of-focus differential, the D1D3 out-of-focus differential, D2D1 out-of-focus differential, D2D3 out-of-focus differential, D3D1 out-of-focus differential and D3D2 out-of-focus differential.

An object of the present invention is to provide a method for detecting lens cleanliness using out-of-focus differential flat field correction in order to effectively improve the efficiency of impurity detection.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 depicts a combined arrangement of out-of-focus differential flat field correction.

PARTS LIST

Figure 1:
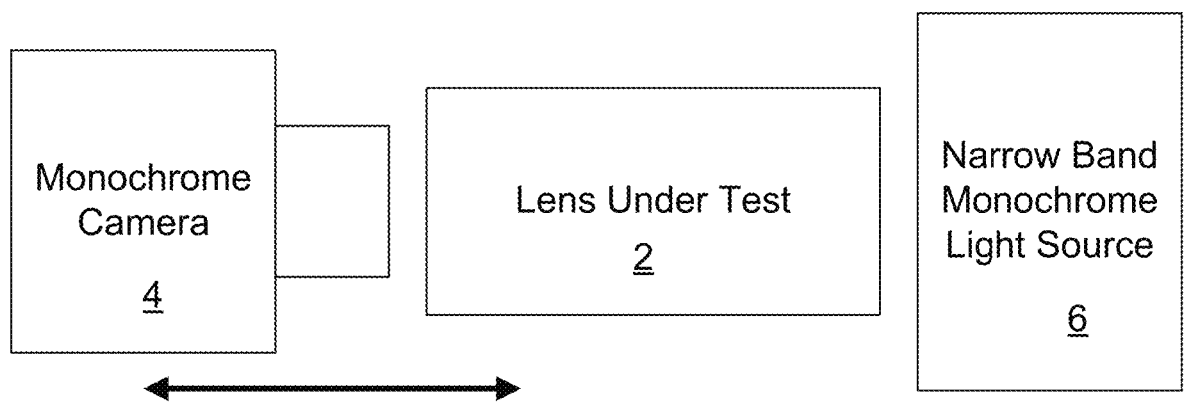
FIG. 1 depicts an out-of-focus differential flat field correction test system.
Figure 2:
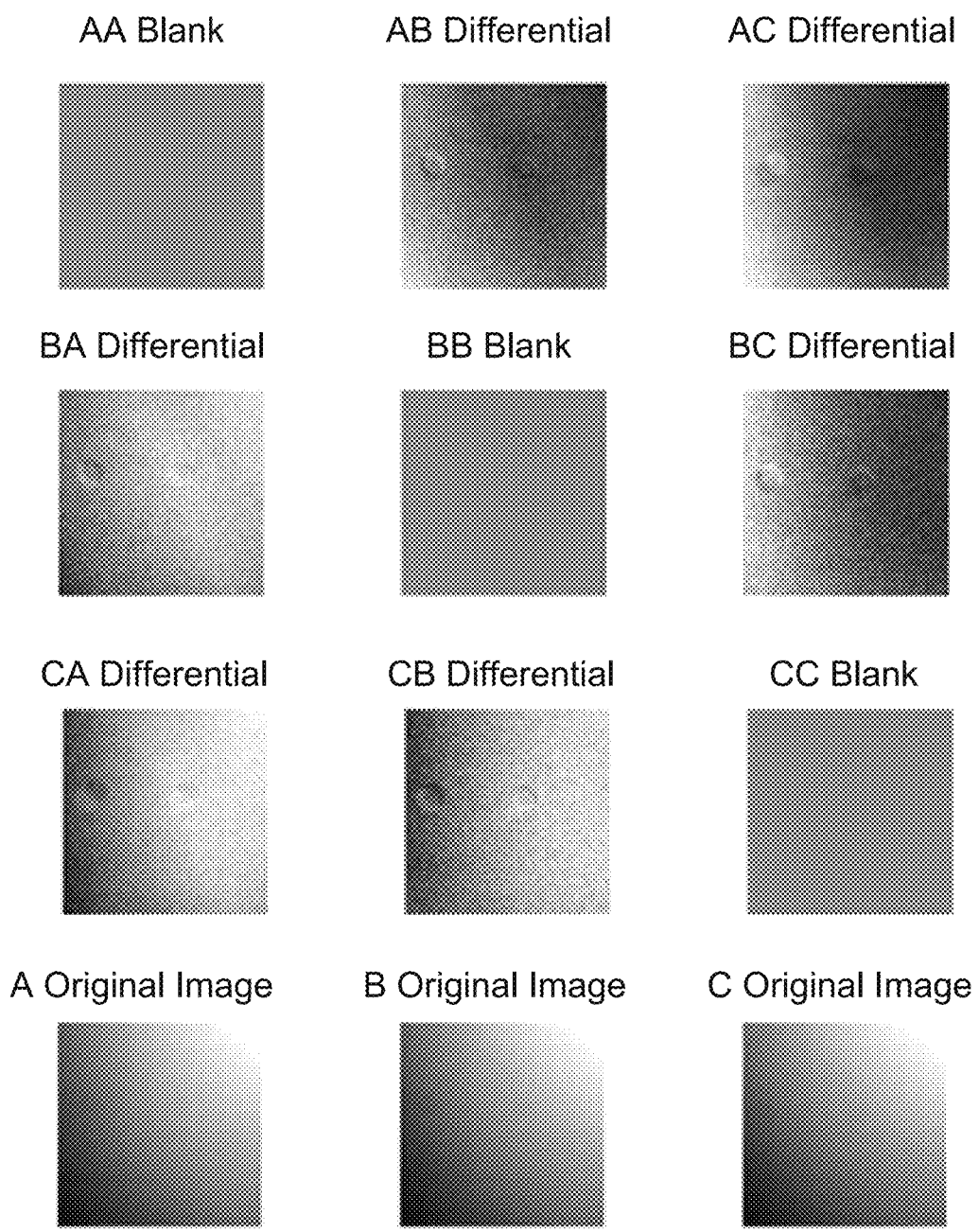
FIG. 2 depicts an image of the differential flat-field correction results for three out-of-focus examples of the present invention.

2—lens
4—camera
6—light source

DETAILED DESCRIPTION OF A PREFERRED EMBODIMENT

There is provided a method for detecting lens cleanliness using out-of-focus differential flat field correction. The method includes first building a flat-field test optical path. The flat-field test optical path includes a light source, a lens to be measured and a monochrome camera. The light-sensitive surface of the monochrome camera is placed perpendicular to the lens axis of the lens to be measured and shifted to the light position of the lens to be measured. For each out-of-focus condition, the camera is disposed such that the camera's light-sensitive surface is located a distance from the focal plane of the lens. The bright-field image data and dark-field image data are collected for each pixel. Bright-field image data is defined as the data obtained when the brightest value at the center of the field of view is 80% to 90% of the saturation value. Dark-field image data is defined as the data obtained when there is no signal input. The camera exposure time is fixed and the brightness of the light source is adjustable. Subsequently, for each pixel, an out-of-focus differential flat field correction is performed where $D_iD_j$ out-of-focus differential=(out-of-focus $D_i$ bright-field image data−out-of-focus $D_i$ dark-field image data)/(out-of-focus $D_j$ bright-field image data−out-of-focus $D_j$ dark-field image data), $D_i$ and $D_j$ are two different kinds of defocuses, i is an index ranging from 1 to N, j is an index ranging from 1 to N and N is the number of defocuses. The matrix of out-of-focus differential results for each pixel is displayed in the form of an image for the determination of lens cleanliness. Bright-field image data and dark-field image data at each out-of-focus condition is measured separately for each pixel under each of the plurality of defocuses. In one embodiment, the performing step includes out-of-focus D1, out-of-focus D2, out-of-focus D3, . . . out-of-focus DN−1, and out-of-focus DN. The out-of-focus differential flat-field correction operation traverses N out-of-focus two-two differential combinations to obtain N×(N−1) kinds of out-of-focus differential combinations. In one embodiment, N is preferably 3, out-of-focus D1=0, out-of-focus D2=0.05 mm, and out-of-focus D3=−0.05 mm. The following flat-field correction is performed for each pixel's bright-field image data and dark-field image data under the three out-of-focus conditions:

$D1D2$ out-of-focus differential=(out-of-focus $D1$ bright-field image data−out-of-focus $D1$ dark-field image data)/(out-of-focus $D2$ bright-field image data−out-of-focus $D2$ dark-field image data).

$D1D3$ out-of-focus differential=(out-of-focus $D1$ bright-field image data−out-of-focus $D1$ dark-field image data)/(out-of-focus $D3$ bright-field image data−out-of-focus $D3$ dark-field image data).

$D2D1$ out-of-focus differential=(out-of-focus $D2$ bright-field image data−out-of-focus $D2$ dark-field image data)/(out-of-focus $D1$ bright-field image data−out-of-focus $D1$ dark-field image data).

$D2D3$ out-of-focus differential=(out-of-focus $D2$ bright-field image data−out-of-focus $D2$ dark-field image data)/(out-of-focus $D3$ bright-field image data−out-of-focus $D3$ dark-field image data).

$D3D1$ out-of-focus differential=(out-of-focus $D3$ bright-field image data−out-of-focus $D3$ dark-field image data)/(out-of-focus $D1$ bright-field image data−out-of-focus $D1$ dark-field image data).

$D3D2$ out-of-focus differential=(out-of-focus $D3$ bright-field image data−out-of-focus $D3$ dark-field image data)/(out-of-focus $D2$ bright-field image data−out-of-focus $D2$ dark-field image data).

The six out-of-focus differentials are displayed in the form of six images for the determination of lens cleanliness.

Compared to the prior art, the present invention has the following significant effects: As only the position of the camera's light-sensitive surface is shifted during the measurement process, the method is easy to be carried out. There are few pre-conditions applicable to a limited number of test equipment. The influence of low relative illumination of the large-angle field of view is suppressed. The signal-to-noise ratio of the large field of view range is improved. Edge enhancement of impurity imaging is obtained. Different out-of-focus imaging offsets in the CCD have a deterministic pattern. After offsetting an impurity relative to the optical center into symmetrical distributions with differential impurity imaging, observable patterns of the impurity are then unified. As the smallest resolvable size is the detector pixel size, the spectral sensitivity of the impurity itself can be effectively used.

The following is a detailed description of the technical scheme of the present invention, taking the specific embodiments as an example, together with the accompanying drawings. There is provided a method for detecting lens cleanliness using out-of-focus differential flat field correction, the method including:

(a) providing a flat-field test light path, the light path including a narrow-band uniform surface light source, the lens to be tested and a monochrome camera that meets the resolution requirements. Camera resolution is the main factor that affects the detection range. It is necessary to determine the monochrome camera that meets the resolution requirement according to the detection accuracy. In this example, the narrow-band uniform surface light source uses an 8-inch monochromatic integrating sphere with a center wavelength of 520 nm and a half-peak width of 20 nm. The lens is mounted onto a V-block tool. The lens is disposed at a large field of view, e.g., 120*120 degrees view angle. The camera is disposed in a manner where the camera's light-sensitive surface is perpendicular to the optical axis of the lens and the camera is translated to a position to detect light through the lens. In this example, the camera uses a pixel size of 5.5 um and a pixel count of 8000*6000, placed at the rear focal plane of the lens;

(b) disposing the camera such that the camera's light-sensitive surface is located a distance from the focal plane of the lens and measuring the bright-field image data and the dark-field image data. The bright-field image data is the data obtained when the brightest value at the center of the field of view is 80% to 90% of the saturation value, and the dark-field image data is the data collected when there is no signal input. The measuring step is performed with the exposure time fixed, the brightness of the light source adjusted so that the camera output falls within its range. The image data can then be collected. Different out-of-focus dark-field image data is collected separately to improve data accuracy. In this example, first, the camera is placed such that the camera's light-sensitive surface at the rear focal plane position, i.e., out-of-focus A is zero. The camera exposure time is fixed at 50 ms. The integrating sphere is adjusted to output 520 nm monochromatic G light and the output to 0 Nits, i.e., no light output, and the camera acquires images as dark-field image data. When the output is 50 Nits and the integrating sphere is configured to output 520 nm G light, the G light is adjusted such that the camera center Region of Interest (ROI) of 1000*1000 pixels is disposed at an average value of 80% of the maximum range. The camera functions in a 12-bit mode, i.e., the average gray value of about 3300, and the image is collected as bright-field image data. The disposing step is repeated to measure the bright-field and dark-field image data at different out-of-focus conditions. In this example, the disposing step is repeated for out-of-focus B=0.05 mm and out-of-focus C=−0.05 mm. The measurement step for each of out-of-focus B and out-of-focus C is similar to the case of out-of-focus A. The camera exposure time is adjusted to be 50 ms. For out-of-focus B, the distance of the camera light-sensitive surface from the rear focal plane of the lens is 0.05 mm, a position recorded as position B. For out-of-focus C, the distance of the camera light-sensitive surface from the rear focal plane of the lens is minus 0.05 mm, a position recorded as position C. The measurement steps for each of out-of-focus B and out-of-focus C is similar to the case of out-of-focus A;

(c) for each out-of-focus bright-field image data and dark-field image data set, flat-field correction operations are performed on the bright-field and dark-field image data respectively under all out-of-focuses.

Calculations for out-of-focus differentials are as follows:

$DiDj$ out-of-focus differential=(out-of-focus Di bright-field image data−out-of-focus Di dark-field image data)/(out-of-focus Dj bright-field image data−out-of-focus Dj dark-field image data) where Di and Dj are two different kinds of defocuses, i is an index ranging from 1 to N, j is an index ranging from 1 to N and N is the number of defocuses.

For out-of-focus D1, out-of-focus D2, out-of-focus D3, out-of-focus DN−1 and out-of-focus DN, there are up to N*(N−1) out-of-focus differential combinations as shown in FIG. 3. The results obtained from different out-of-focus combinations vary depending on the physical properties of the impurities, including but not limited to size, three-dimensional shape, transmittance, refractive index, etc. Therefore, traversing various out-of-focus combinations enriches the detection information and improves the judgment efficiency. In this example, six sets of data are obtained for the bright-field and dark-field of 0, 0.05 mm, and −0.05 mm out-of-focus, respectively, through steps (a) through (c), i.e., each pixel of the camera has six data sets independent of other pixels in the form of a matrix. For each pixel P, a flat-field correction is performed, and the data processing for each pixel is independent of each other, with no interaction between pixels. The following six differential operations are obtained.

$AB$ out-of-focus differential=($A$ out-of-focus bright-field image data−dark-field image data)/($B$ out-of-focus bright-field image data−dark-field image data).

$AC$ out-of-focus differential=($A$ out-of-focus bright-field image data−dark-field image data)/($C$ out-of-focus bright-field image data−dark-field image data).

$BA$ out-of-focus differential=($B$ out-of-focus bright-field image data−dark-field image data)/($A$ out-of-focus bright-field image data−dark-field image data).

$BC$ out-of-focus differential=($B$ out-of-focus bright-field image data−dark-field image data)/($C$ out-of-focus bright-field image data−dark-field image data).

$CA$ out-of-focus differential=($C$ out-of-focus bright-field image data−dark-field image data)/($A$ out-of-focus bright-field image data−dark-field image data).

$CB$ out-of-focus differential=($C$ out-of-focus bright-field image data−dark-field image data)/($B$ out-of-focus bright-field image data−dark-field image data); and $CB$ out-of-focus differential= ($C$ out-of-focus bright-field image data−dark-field image data).

The resulting matrix of out-of-focus differentials is displayed directly in the form of an image for the determination of lens cleanliness. As can be seen from the differentials, the differential flat field correction results are less affected by the intensity distribution of the image itself, which can suppress the effect of low relative illumination of the large-angle field of view. At a first location, a first data point appears smaller than the surrounding pixels and the image is presented as a dark spot. At a second location, a second data point appears larger than the surrounding pixels and the image is presented as a bright spot. The impurity information is extracted and enlarged in the positive and negative directions. The distribution of the two points of light and dark is shown. There is a uniform pattern of distribution where two positions of the same impurity overlap one another and the edges of the overlap show a clear contrast with an edge-enhancing effect. During the entire measurement process, only the position of the camera's sensitive surface is moved. This method is easy to use, has few pre-conditions and is suitable for situations where the test instrument is limited.

What is claimed herein is:

1. A method for detecting lens cleanliness of a lens in a flat-field optical path, the flat-field optical path comprises a light source, the lens, a camera, the light source is a narrow-band multispectral uniform surface light source, the camera's light-sensitive surface is disposed perpendicular to an optical axis of the lens and in the light position of the lens, said method comprising:
   (a) disposing the camera such that the camera's light-sensitive surface is located a distance from the focal plane of the lens and measuring the bright-field image data and the dark-field image data;
   (b) for each pixel, performing an out-of-focus differential flat field correction to yield a plurality of DiDj out-of-focus differentials, wherein a DiDj out-of-focus differential=(out-of-focus Di bright-field image data–out-of-focus Di dark-field image data)/(out-of-focus Dj bright-field image data–out-of-focus Dj dark-field image data) and Di and Dj are two different defocuses, i is an index ranging from 1 to N, j is an index ranging from 1 to N and N is the number of defocuses;
   (c) repeating said disposing step and said performing step by altering said distance at least two more times; and
   (d) displaying said out-of-focus differentials in the form of a plurality of images to show uniformity of each said image, wherein a non-uniform area on each said image is determined to have been caused by an impurity of the lens.

2. The method of claim 1, wherein:
   (a) said N is 3;
   (b) out-of-focus D1 is 0;
   (c) out-of-focus D2 is 0.05 mm;
   (d) out-of-focus D3 is −0.05 mm;
   (e) D1D2 out-of-focus differential=(out-of-focus D1 bright-field image data–out-of-focus D1 dark-field image data)/(out-of-focus D2 bright-field image data–out-of-focus D2 dark-field image data);
   (f) D1D3 out-of-focus differential=(out-of-focus D1 bright-field image data–out-of-focus D1 dark-field image data)/(out-of-focus D3 bright-field image data–out-of-focus D3 dark-field image data);
   (g) D2D1 out-of-focus differential=(out-of-focus D2 bright-field image data–out-of-focus D2 dark-field image data)/(out-of-focus D1 bright-field image data–out-of-focus D1 dark-field image data);
   (h) D2D3 out-of-focus differential=(out-of-focus D2 bright-field image data–out-of-focus D2 dark-field image data)/(out-of-focus D3 bright-field image data–out-of-focus D3 dark-field image data);
   (i) D3D1 out-of-focus differential=(out-of-focus D3 bright-field image data–out-of-focus D3 dark-field image data)/(out-of-focus D1 bright-field image data–out-of-focus D1 dark-field image data);
   (j) D3D2 out-of-focus differential=(out-of-focus D3 bright-field image data–out-of-focus D3 dark-field image data)/(out-of-focus D2 bright-field image data–out-of-focus D2 dark-field image data).

3. The method of claim 2, wherein said plurality of images comprise six images comprising said D1D2 out-of-focus differential, said D1D3 out-of-focus differential, D2D1 out-of-focus differential, D2D3 out-of-focus differential, D3D1 out-of-focus differential and D3D2 out-of-focus differential.

* * * * *